(12) United States Patent
Chiang et al.

(10) Patent No.: US 11,543,313 B2
(45) Date of Patent: Jan. 3, 2023

(54) BICYCLE POWER METER

(71) Applicant: TIEN HSIN INDUSTRIES CO., LTD., Taichung (TW)

(72) Inventors: Meng-Hua Chiang, Taichung (TW); Wei-Chih Wei, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 287 days.

(21) Appl. No.: 16/909,086

(22) Filed: Jun. 23, 2020

(65) Prior Publication Data
US 2021/0396611 A1 Dec. 23, 2021

(51) Int. Cl.
| | |
|---|---|
| *G01L 5/22* | (2006.01) |
| *G01L 3/24* | (2006.01) |
| *G01L 5/1627* | (2020.01) |
| *B62J 45/411* | (2020.01) |
| *B62J 45/20* | (2020.01) |
| *B62J 50/21* | (2020.01) |
| *A63B 24/00* | (2006.01) |
| *B62J 45/422* | (2020.01) |

(52) U.S. Cl.
CPC ............ *G01L 3/24* (2013.01); *A63B 24/0062* (2013.01); *B62J 45/20* (2020.02); *B62J 45/411* (2020.02); *B62J 45/422* (2020.02); *B62J 50/21* (2020.02); *G01L 5/1627* (2020.01); *G01L 5/22* (2013.01); *A63B 2220/833* (2013.01)

(58) Field of Classification Search
CPC ............ G01L 3/24; G01L 5/22; G01L 5/1627
See application file for complete search history.

(56) References Cited

U.S. PATENT DOCUMENTS

| | | | | |
|---|---|---|---|---|
| 2013/0054143 A1* | 2/2013 | DeGolier | ................ | G01M 9/06 702/41 |
| 2013/0291656 A1* | 11/2013 | Yap | ........................ | G01L 3/1457 73/862.191 |
| 2016/0008663 A1* | 1/2016 | Zhu | .......................... | G01L 3/108 482/8 |
| 2018/0148130 A1* | 5/2018 | Staehlin | ................... | B62M 1/30 |

(Continued)

FOREIGN PATENT DOCUMENTS

| | | | | |
|---|---|---|---|---|
| CN | 102969993 A | * | 3/2013 | ............. B62J 99/00 |
| DE | 102020109567 A1 | * | 10/2020 | |

(Continued)

*Primary Examiner* — Jamel E Williams
(74) *Attorney, Agent, or Firm* — Apex Juris, PLLC; R Wylie; Tracy Heims

(57) ABSTRACT

A bicycle power meter includes a strain gauge, a signal processing unit, a processor, and a signal transmitter. The strain gauge is disposed on at least one of an outer peripheral wall and an inner peripheral wall of a handlebar of a bicycle. The signal processing unit connected to the strain gauge by signal correspondingly outputs an electrical signal based on a deformation of the handlebar detected by the strain gauge. The processor connected to the signal processing unit by signal receives the electrical signal sent by the signal processing unit and calculates a measuring value based on the electrical signal and sends the measuring value in an output signal. The signal transmitter connected to the processor by signal receives the output signal sent by the processor and converts the output signal to a wired or wireless signal and sends the wired or wireless signal to a terminal device.

14 Claims, 12 Drawing Sheets

(56) References Cited

U.S. PATENT DOCUMENTS

| | | | | |
|---|---|---|---|---|
| 2021/0039737 A1* | 2/2021 | Montez | ................. | H04N 5/247 |
| 2021/0214040 A1* | 7/2021 | Shahana | ................ | B62K 25/08 |
| 2021/0308522 A1* | 10/2021 | Booher | ................. | G16H 20/30 |
| 2021/0396614 A1* | 12/2021 | Chiang | ................ | G01L 5/1627 |

FOREIGN PATENT DOCUMENTS

| | | | | | |
|---|---|---|---|---|---|
| WO | WO-2012159087 A1 | * | 11/2012 | ......... | A63B 24/0075 |
| WO | WO-2016057697 A1 | * | 4/2016 | ........... | A43B 3/0005 |

\* cited by examiner

BICYCLE POWER METER

BACKGROUND OF THE INVENTION

Technical Field

The present disclosure relates generally to a power meter of a bicycle, and more particularly to a power meter which could detect a power exerted on a handlebar by a user.

Description of Related Art

In order to monitor a riding performance, a bicyclist usually mounts a power meter on a bicycle to make a riding performance measurable, wherein a measuring result could be used as a reference for training. The conventional power meter is generally disposed on pedals or on cranks of the bicycle to measure forces exerted to the pedals or the cranks of the bicycle by legs of the bicyclist, thereby to calculate a power exerted by the bicyclist and output the power for reference, and therefore the bicyclist can effectively monitor the power outputted by his/her own, improving the riding performance.

However, riding the bicycle is a whole-body exercise, which means the power output of a bicyclist when riding the bicycle is not limited to the legs. The conventional power meter installed on the pedal or the crank of the bicycle can effectively detect the output power of mainly the legs of the rider, but cannot detect the power output from the other parts of the rider's body, so that the bicyclist cannot monitor the power output accurately, which affects the riding performance. In all aspects, the conventional power meter still has room for improvement.

BRIEF SUMMARY OF THE INVENTION

In view of the above, the primary objective of the present disclosure is to provide a bicycle power meter which could detect a power exerted on a handlebar by a bicyclist.

The present disclosure provides a bicycle power meter which is applied to a bicycle, wherein the bicycle includes a head and a frame. The head includes a handlebar and a stem. The stem is connected to the handlebar and the frame. The bicycle power meter includes at least one strain gauge, a signal processing unit, a processor, and a signal transmitter. The at least one strain gauge is disposed on an outer peripheral wall of the handlebar, on an inner peripheral wall of the handlebar, or on both the outer peripheral wall and the inner peripheral wall of the handlebar. The signal processing unit is connected to the at least one strain gauge by signal, wherein the signal processing unit correspondingly outputs an electrical signal based on a deformation of the handlebar detected by the at least one strain gauge. The processor is connected to the signal processing unit by signal, wherein the processor receives the electrical signal of the signal processing unit and calculates a measuring value based on the electrical signal and outputs the measuring value in an output signal. The signal transmitter connected to the processor by signal, wherein the signal transmitter receives the output signal outputted by the processor and converts the output signal to a wired or wireless signal and sends the wired or wireless signal to a terminal device.

With the aforementioned design, the at least one strain gauge of the bicycle power meter is disposed on an outer peripheral wall of the handlebar, on an inner peripheral wall of the handlebar, or on both the outer peripheral wall and the inner peripheral wall of the handlebar, thereby the at least one strain gauge of the bicycle power meter could detect deformations of the handlebar when the bicyclist rides the bicycle or when the bicyclist pedals out of a saddle of the bicycle, and the processor calculates the measuring value based on the electrical signal and outputs the measuring value in the output signal for reference. In this way, the bicyclist could realize the power values outputted when the bicyclist rides the bicycle or pedals out of the saddle more comprehensive, which facilitates to enhance the riding performance of the bicyclist. In addition, the bicyclist could monitor the stress value that the handlebar bears, and the strain value of the handlebar at the same time, thereby to estimate a degree of fatigue of the handlebar and a service life of the handlebar.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
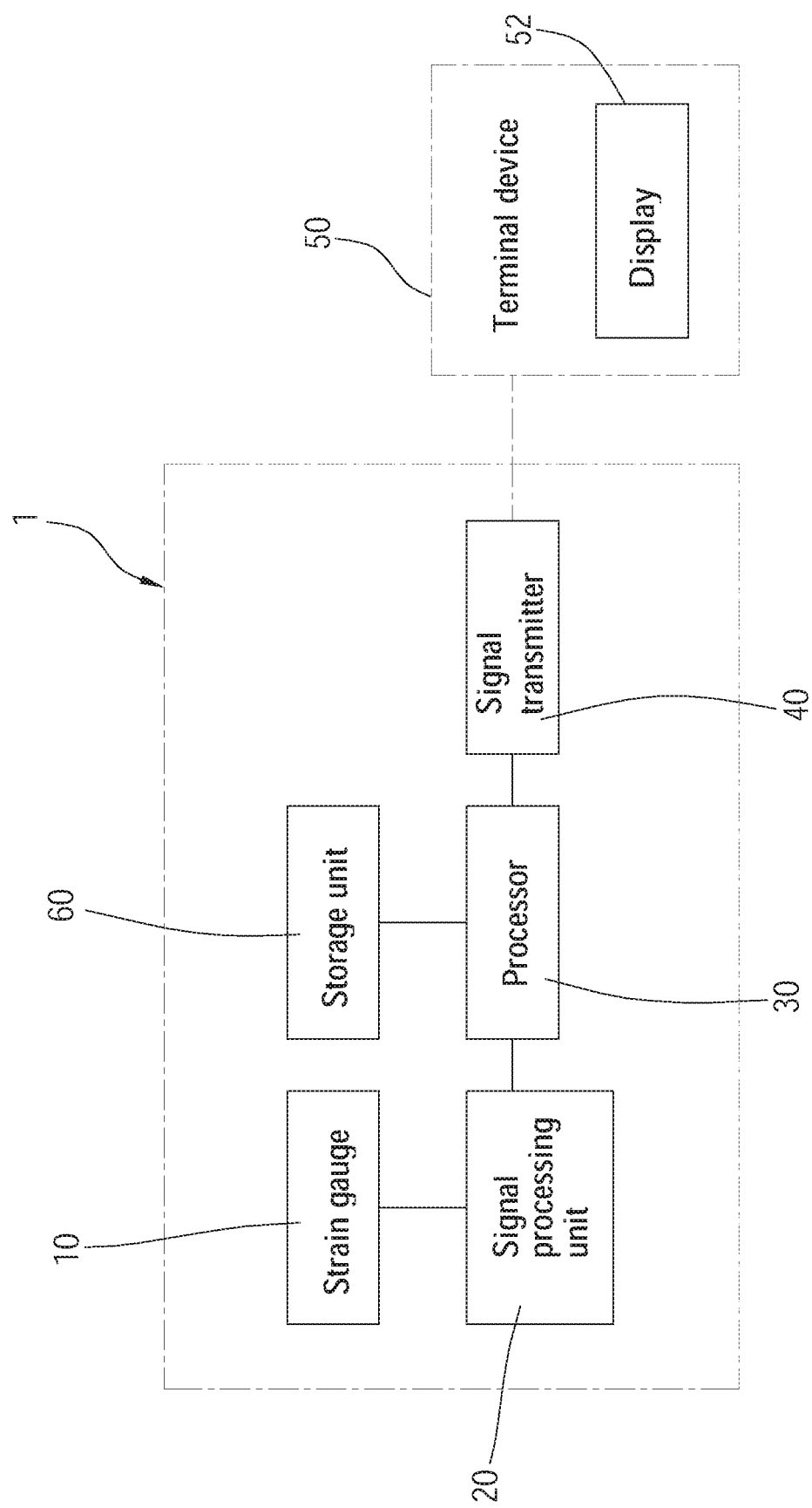
FIG. 1 is a block diagram of the bicycle power meter according to an embodiment of the present disclosure.
Figure 2:
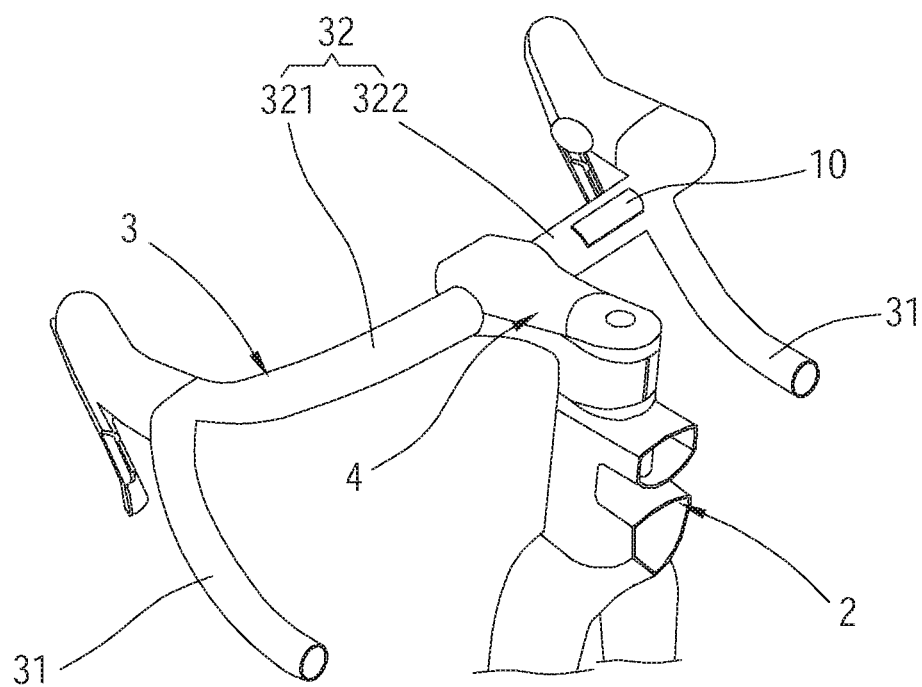
FIG. 2 is a schematic view showing the bicycle power meter according to the embodiment of the present disclosure is disposed on the handlebar.
Figure 3:
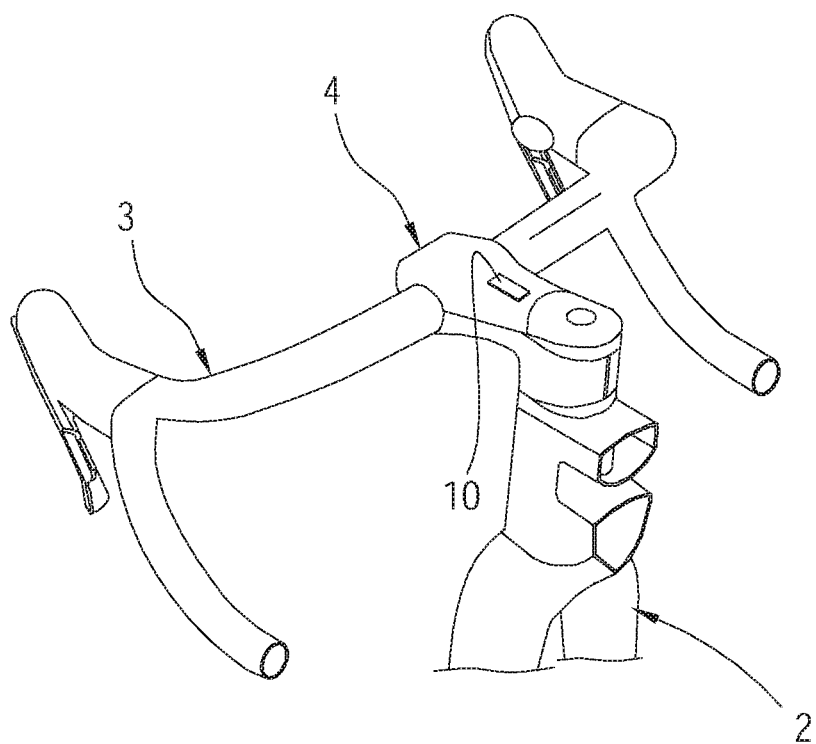
FIG. 3 is a schematic view showing the bicycle power meter according to the embodiment of the present disclosure is disposed on the stem.

A bicycle power meter 1 of an embodiment according to the present disclosure is illustrated in FIG. 1, which includes a strain gauge 10, a signal processing unit 20, a processor 30, and a signal transmitter 40. The bicycle power meter 1 is applied to a bicycle, wherein the bicycle includes a head and a frame 2. The head includes a handlebar 3 and a stem 4, wherein the stem 4 is respectively connected to the handlebar 3 and a steerer tube of a fork of the frame 2. Referring to FIG. 2 and FIG. 3, the strain gauge 10 could be disposed on the handlebar 3 as shown in FIG. 2 or could be disposed on the stem 4 as shown in FIG. 3, thereby to detect a deformation of the handlebar 3 or a deformation of the stem 4.

Referring to FIG. 1, the strain gauge 10 is connected to the signal processing unit 20 by signal, and the processor 30 is respectively connected to the signal processing unit 20 and the signal transmitter 40 by signal. In this way, the signal processing unit 20 correspondingly outputs an electrical signal based on the deformations of the handlebar 3 or the stem 4 detected by the strain gauge 10. The processor 30 receives the electrical signal outputted by the signal processing unit 20 and calculates a measuring value based on the electrical signal and outputs the measuring value in an output signal. The signal transmitter 40 receives the output signal outputted by the processor 30 and converts the output signal to a wired or wireless signal and sends the wired or wireless signal to a terminal device 50 for being read by the user. As used in the description herein and throughout the claims that follow, the meaning of "connected by signal" may include a wired or wireless connection.

In addition, the signal processing unit 20 includes a bridge circuit, an amplifier circuit, and an analog to digital converting circuit, wherein the bridge circuit is connected to the amplifier circuit, and the amplifier circuit is connected to the analog to digital converting circuit. When the strain gauge 10 detects the deformations of the handlebar 3 or the stem 4 to correspondingly generate a resistance change, the amplifier circuit amplifies an output voltage, which is generated by the bridge circuit based on the resistance change, and the analog to digital converting circuit converts the output voltage to a digital electrical signal and sends the digital electrical signal to the processor 30. In this way, the processor 30 could correspondingly output the output signal based on the deformations of the handlebar 3 or the stem 4 detected by the strain gauge 10.

The measuring value includes at least one of a power value, a torque value, a stress value, and a strain value, or a combination of at least two of the power value, the torque value, the stress value, and the strain value. The terminal device 50 includes a display 52 which is connected to the signal transmitter 40 by signal to correspondingly display a detecting result of the strain gauge 10 for reference. The terminal device 50 could be a computer, a smartphone, a bicycle cyclocomputer, and so on. In this way, when the strain gauge 10 deforms with the handlebar 3 or the stem 4, the resistance change of the strain gauge 10 could reflect the detecting result to the terminal device 50 for reference, the detecting result could be, such as at least one of the power value outputted by the user, the torque value exerted on the handlebar 3 or the stem 4 by the user, the stress value that the handlebar 3 or the stem 4 bears, and the strain value of the handlebar 3 or the stem 4, or a combination thereof, thereby could not only detect the power values exerted on the handlebar 3 or the stem 4 by the user in different situations (e.g., when riding on bumpy roads, when pedals out of a saddle of the bicycle, or when riding in a fixed riding posture), and could but also monitor the stress value that the handlebar 3 or the stem 4 bears, and the strain value of the handlebar 3 or the stem 4, so as to estimate a degree of fatigue of the handlebar 3 or the stem 4 and a service life of the handlebar 3 or the stem 4. In addition, said data (i.e., the measuring value) could be applied to a bicycle with an auxiliary power, thereby to determine whether the user needs an intervention of the auxiliary power or to determine how much auxiliary power the user needs based on the data.

The bicycle power meter 1 includes a storage unit 60 which is connected to the processor 30 by signal, wherein a comparison value (e.g. a specific value or a range of values) is stored in the storage unit 60. When the processor 30 receives the electrical signal, that the signal processing unit 20 outputs based on the deformations of the handlebar 3 or the stem 4 detected by the strain gauge 10, and calculates the measuring value based on the electrical signal, the processor 30 compares the measuring value and the comparison value based on the comparison value stored in the storage unit 60 and generates a comparison result. When there is a specific relation between the measuring value and the comparison value (e.g. when the measuring value is greater than the comparison value or when the measuring value falls out of the range of the comparison value), the processor 30 sends a prompting signal to the signal transmitter 40 based on the comparison result. The signal transmitter 40 receives the prompting signal and converts the prompting signal to a wired or wireless signal and sends the wired or wireless signal to the terminal device 50 for prompting the user. In this way, when the strain gauge 10 detects that the handlebar 3 or the stem 4 generates an unusual deformation, the processor 30 could send the prompting signal to the terminal device 50 in a form of a text, a lighting, an image, or all of the text, the lighting, and the image for reminding the user to pay attention and to replace the handlebar 3 or the stem 4, preventing the handlebar 3 or the stem 4 from suddenly damaging or breaking due to long-term stress.

Figure 4:
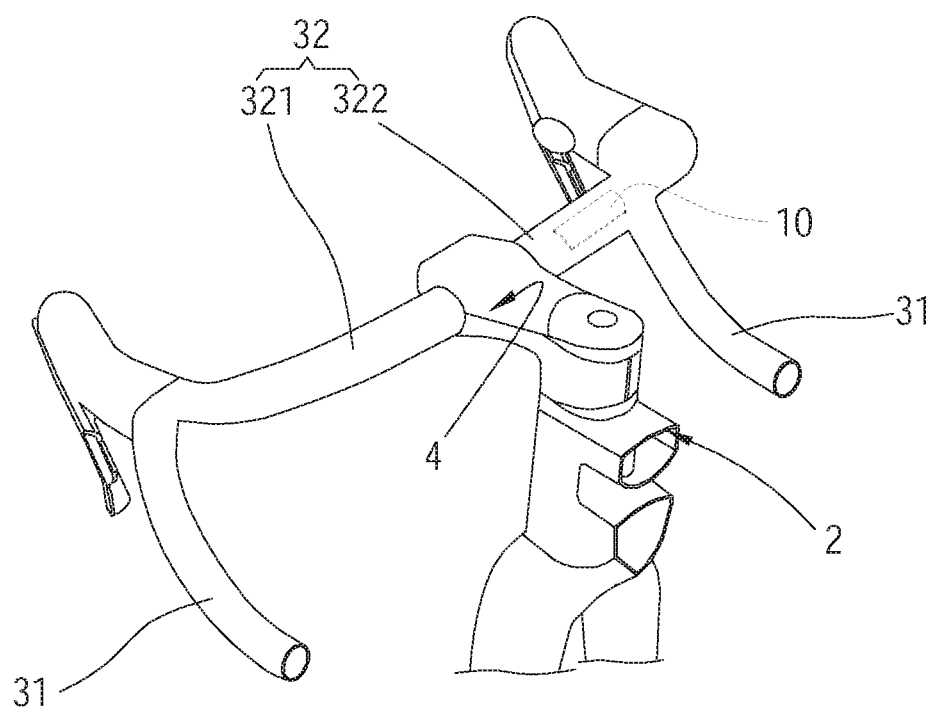
FIG. 4 is a schematic view showing the bicycle power meter according to the embodiment of the present disclosure is disposed inside the handlebar.
Figure 5:
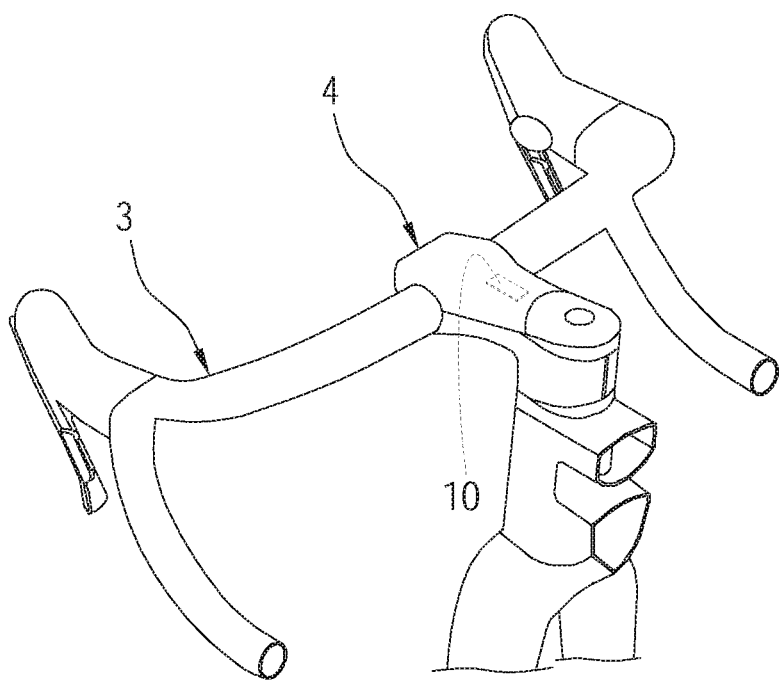
FIG. 5 is a schematic view showing the bicycle power meter according to the embodiment of the present disclosure is disposed inside the stem.
Figure 6:
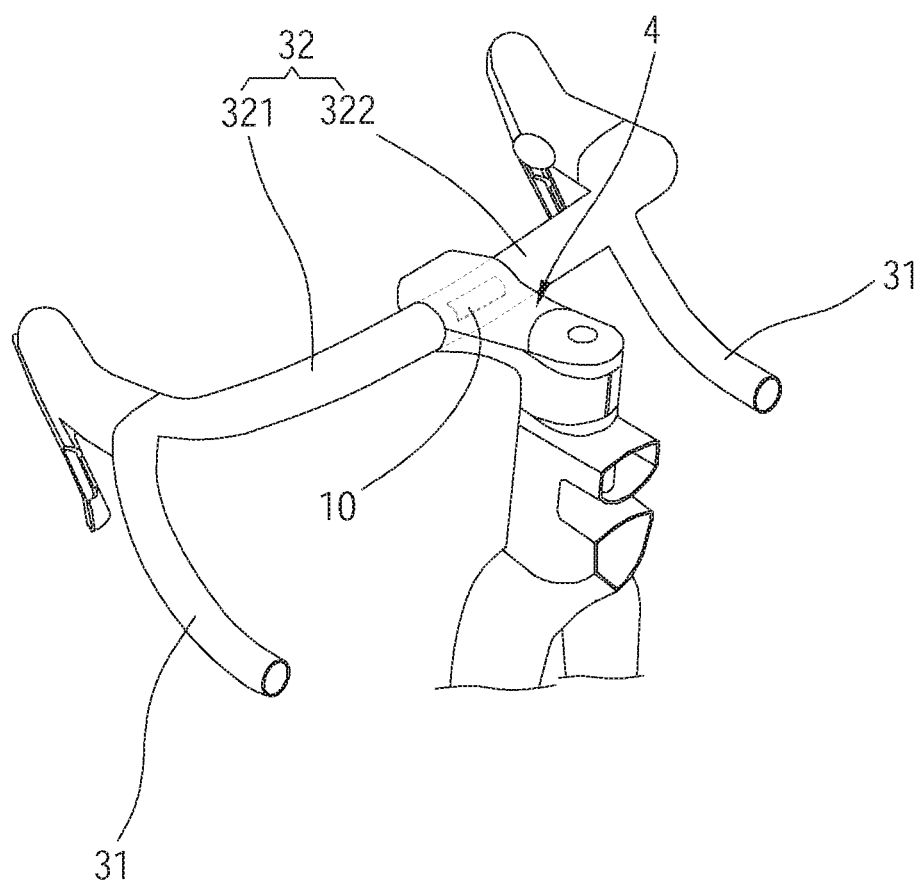
FIG. 6 is a schematic view showing the bicycle power meter according to the embodiment of the present disclosure is disposed inside the handlebar.

In the current embodiment, the handlebar 3 includes two gripping portions 31 and a connecting portion 32 as shown in FIG. 2, wherein one of the gripping portions 31 is connected to an end of the connecting portion 32, and the other one of the gripping portions 31 is connected to another end of the connecting portion 32. The gripping portions 31 are adapted to be gripped by the user. The strain gauge 10 is attached on an outer peripheral wall or an inner peripheral wall of the connecting portion 32 of the handlebar 3 to detect a deformation of the connecting portion 32 of the handlebar 3, wherein the strain gauge 10 disposed on the outer peripheral wall of the handlebar 3 has the advantage of easily installing, replacing, and maintaining. In other embodiments, the strain gauge 10 could be disposed on the inner peripheral wall of the handlebar 3 as shown in FIG. 4, thereby to reduce external force collision and have a better appearance at the same time. Similarly, the strain gauge 10 could be attached to an outer peripheral wall of the stem 4 as shown in FIG. 3 for easily installing, replacing, and maintaining, or could be disposed on an inner peripheral wall of the stem 4 as shown in FIG. 5 for reducing external force collision and providing a better appearance at the same time. In practice, the strain gauge 10 could be disposed on other positions of the stem 4, but not limited to the disposing positions shown in FIG. 3 and FIG. 5. In addition, the connecting portion 32 of the handlebar 3 has a left section 321 and a right section 322 which are connected to each other, wherein the strain gauge 10 could be disposed on the left section 321, the right section 322, or a middle section of the connecting portion 32 as shown in FIG. 6, thereby to detect the deformations of the handlebar 3 generated on different positions.

When the bicycle power meter 1 includes two strain gauges 10, the strain gauges 10 could be respectively disposed on the left section 321 and the right section 322.

Figure 7:
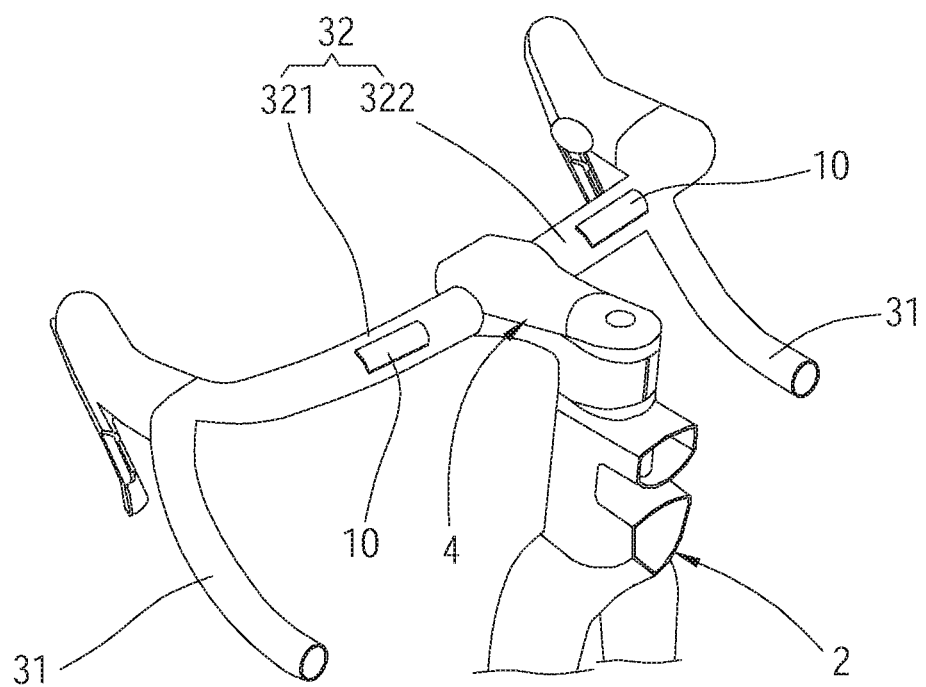
FIG. 7 is a schematic view showing the bicycle power meter according to the embodiment of the present disclosure is disposed on the left section and the right section of the handlebar.
Figure 8:
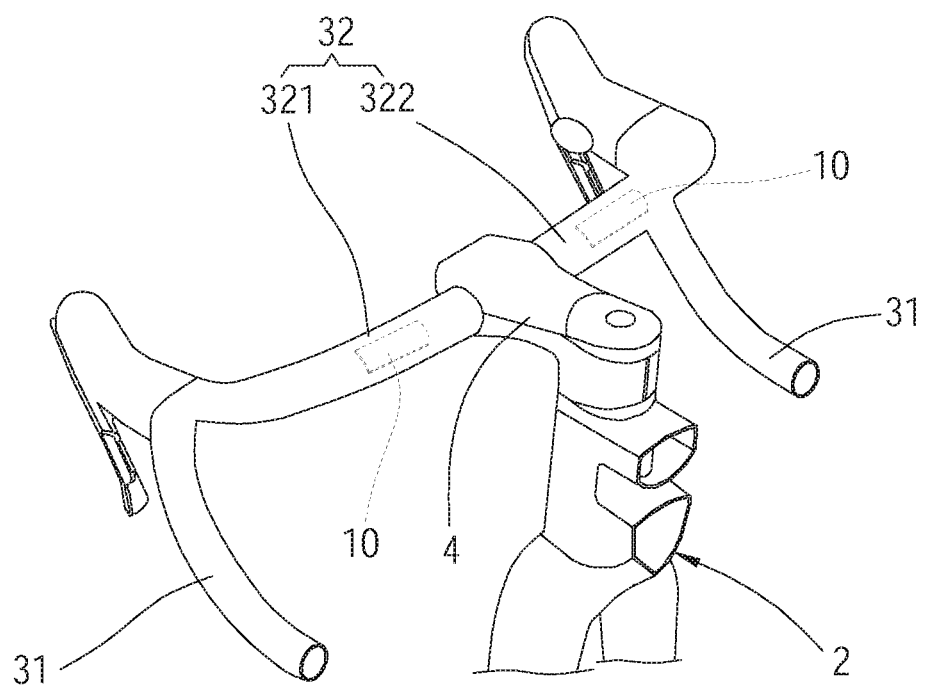
FIG. 8 is a schematic view showing the bicycle power meter according to the embodiment of the present disclosure is disposed inside the left section and the right section of the handlebar.

Similarly, the strain gauges 10 could be disposed on the outer peripheral wall of the handlebar 3 as shown in FIG. 7 or could be disposed on the inner peripheral wall of the handlebar 3 as shown in FIG. 8, wherein the processor 30 could respectively calculate a left measuring value and a right measuring value based on deformations of the left section 321 and the right section 322 detected by the strain gauge 10 disposed on the left section 321 and the right section 322, and could respectively output the left measuring value and the right measuring value in the output signal. In this way, the user could further realize the data such as power values respectively outputted by user's left and right hands, the torque values respectively exerted on the handlebar 3 by the user's left and right hands, the strain values that the left section 321 and the right section 322 of the handlebar 3 respectively bear, and the strain values of the left section 321 and the right section 322 of the handlebar 3.

In an embodiment, the processor 30 could calculate a percentage of the left measuring value out of a sum of the left measuring value and the right measuring value and a percentage of the right measuring value out of the sum of the left measuring value and the right measuring value based on the left measuring value and the right measuring value, and send the percentages in the output signal, thereby to provide the data to the user, such as percentages of the power values respectively outputted by the user's left and right hands, percentages of the torque values respectively exerted on the handlebar 3 by the user's left and right hands, percentages of the strain values that the left section 321 and the right section 322 of the handlebar 3 respectively bear, and percentages of the strain values of the left section 321 and the right section 322 of the handlebar 3.

Figure 9A:
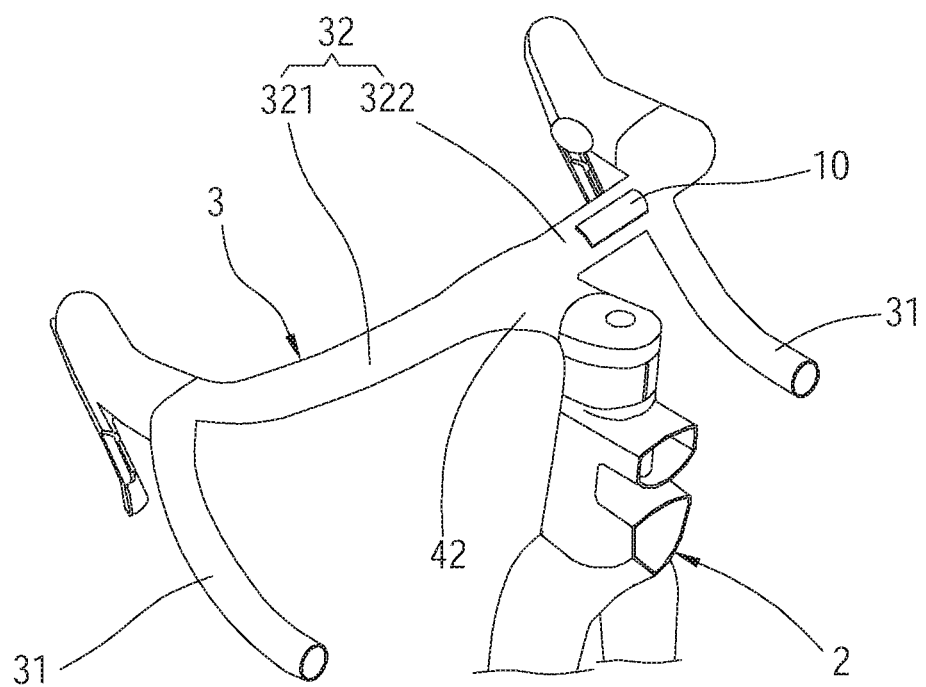
FIG. 9A is a schematic view showing the bicycle power meter according to the embodiment of the present disclosure is disposed on the integral handlebar.
Figure 9B:
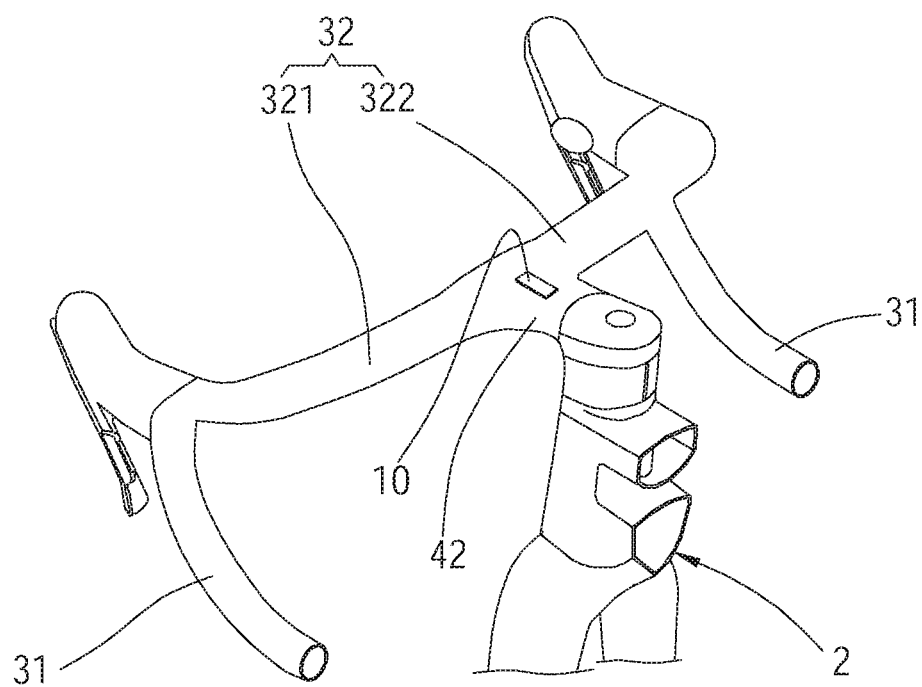
FIG. 9B is a schematic view showing the bicycle power meter according to the embodiment of the present disclosure is disposed on the integral handlebar.
Figure 10A:
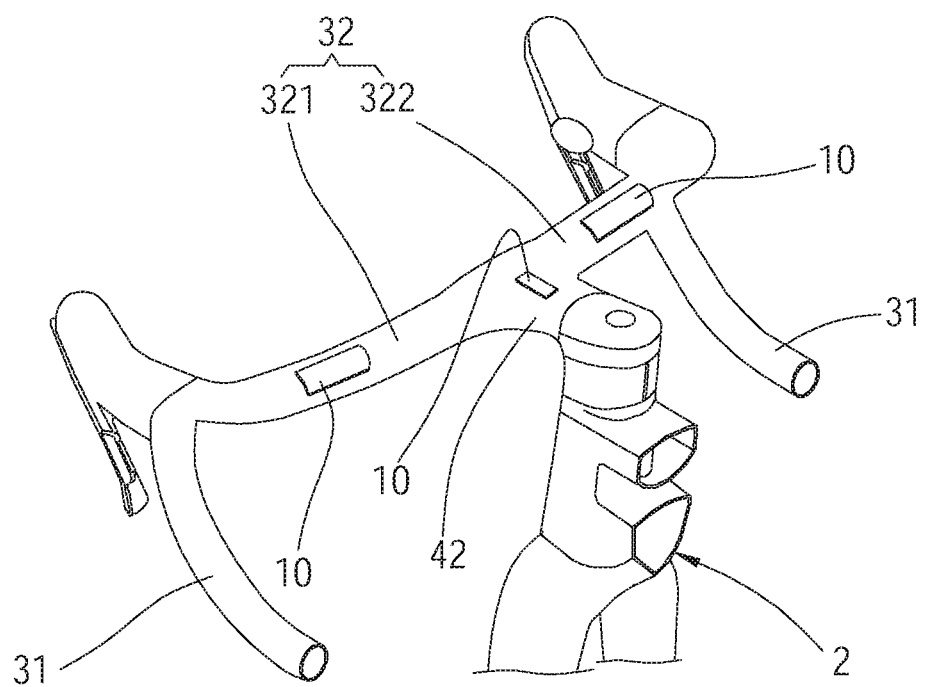
FIG. 10A is a schematic view showing the bicycle power meter according to the embodiment of the present disclosure is disposed on the integral handlebar.
Figure 10B:
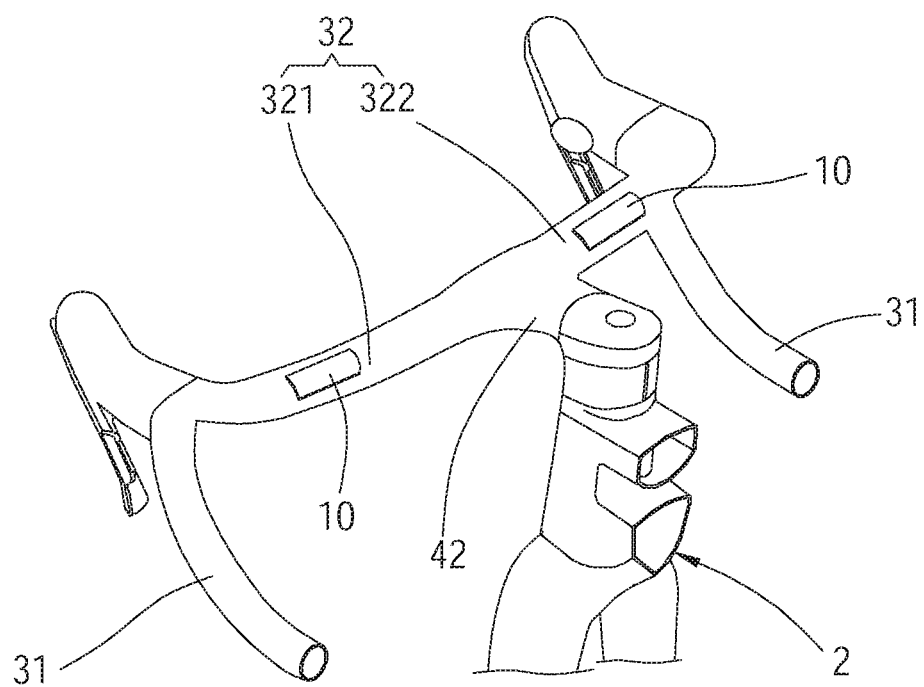
FIG. 10B is a schematic view showing the bicycle power meter according to the embodiment of the present disclosure is disposed on the integral handlebar.

It is worth mentioning that, referring to FIG. 9A and FIG. 9B, the bicycle power meter 1 of the present disclosure could be applied to an integral handlebar that the handlebar and the stem are integrally formed as a monolithic unit, wherein the integral handlebar has two gripping portions 31, a connecting portion 32, and an engaging portion 42. One of the gripping portions 31 is connected to an end of the connecting portion 32, and the other of the gripping portions 31 is connected to another end of the connecting portion 32. The gripping portions 31 are adapted to be gripped by the user. The connecting portion 32 has a left section 321 and a right section 322 which are connected to each other. An end of the engaging portion 42 is connected to the connecting portion 32, and another end of the engaging portion 42 extends in a direction away from the connecting portion 32 and is connected to a steerer tube of a fork of the frame 2. The strain gauge 10 could be attached to the connecting portion 32 as shown in FIG. 9A or could be attached to the engaging portion 42 as shown in FIG. 9B, thereby to detect deformations of the connecting portion 32 or the engaging portion 42 of the integral handlebar. Similarly, the strain gauge 10 could be disposed outside or inside the connecting portion 32 or be disposed outside or inside the engaging portion 42. When the bicycle power meter 1 includes two or more strain gauges 10, the strain gauges 10 could be selectively disposed on the left section 321, the right section 322, or the engaging portion 42 as shown in FIG. 10A and FIG. 10B. Moreover, the bicycle power meter 1 of the present disclosure not only could be applied to a bent handlebar as shown in FIG. 9A, FIG. 9B, FIG. 10A, and FIG. 10B, but also could be applied to a flat bar which is commonly used by mountain bicycles, aerobars or tri-bars which are commonly used in race.

In conclusion, the bicycle power meter 1 of the present disclosure not only could detect the power values exerted on the handlebar 3 or the stem 4 by the user, but also could monitor a riding performance of the user more comprehensive, and could monitor the torque value exerted on the handlebar 3 or the stem 4, the stress value that the handlebar 3 or the stem 4 bears, and the strain value of the handlebar 3 or the stem 4 at the same time, thereby to estimate a degree of fatigue of the handlebar 3 or the stem 4 and a service life of the handlebar 3 or the stem 4.

It must be pointed out that the embodiment described above is only a preferred embodiment of the present disclosure. All equivalent structures which employ the concepts disclosed in this specification and the appended claims should fall within the scope of the present disclosure.

What is claimed is:

1. A bicycle power meter which is applied to a bicycle, wherein the bicycle comprises a head and a frame; the head comprises a handlebar and a stem; the stem is connected to the handlebar and the frame; the bicycle power meter comprises:
   at least one strain gauge disposed on an outer peripheral wall of the handlebar, on an inner peripheral wall of the handlebar, or on both the outer peripheral wall and the inner peripheral wall of the handlebar;
   a signal processing unit connected to the at least one strain gauge by signal, wherein the signal processing unit correspondingly outputs an electrical signal based on a deformation of the handlebar detected by the at least one strain gauge;
   a processor connected to the signal processing unit by signal, wherein the processor receives the electrical signal of the signal processing unit and calculates a measuring value based on the electrical signal and outputs the measuring value in an output signal;
   a signal transmitter connected to the processor by signal, wherein the signal transmitter receives the output signal outputted by the processor and converts the output signal to a wired or wireless signal and sends the wired or wireless signal to a terminal device; and
   a storage unit connected to the processor by signal, wherein at least one comparison value is stored in the storage unit; the processor compares the measuring value and the at least one comparison value to generate a comparison result, and sends a prompting signal to the signal transmitter based on the comparison result; the signal transmitter receives the prompting signal and converts the prompting signal to a wired or wireless signal and sends the wired or wireless signal converted from the prompting signal to the terminal device for prompting a user.

2. The bicycle power meter of claim 1, wherein the handlebar comprises two gripping portions and a connecting portion; one of the gripping portions is connected to an end of the connecting portion, and the other of the gripping portions is connected to another end of the connecting portion; the at least one strain gauge is disposed on the connecting portion.

3. The bicycle power meter of claim 1, wherein the measuring value comprises at least one of a power value, a torque value, a stress value, and a strain value, or a combination thereof.

4. The bicycle power meter of claim 1, wherein the at least one comparison value is a range of values; when the comparison result is that the measuring value falls out of the range of values, the processor sends the prompting signal to the signal transmitter.

5. The bicycle power meter of claim 1, wherein the at least one comparison value is a specific value; when the comparison result is that the measuring value is greater than the specific value, the processor sends the prompting signal to the signal transmitter.

6. The bicycle power meter of claim 2, wherein the connecting portion has a left section and a right section which are connected to each other; the at least one strain gauge comprises two strain gauges respectively disposed on the left section and the right section; the processor respectively calculates a left measuring value and a right measuring value based on deformations of the left section and the right section detected by the strain gauges disposed on the left section and the right section, and respectively outputs the left measuring value and the right measuring value in the output signal.

7. The bicycle power meter of claim 6, wherein the processor calculates a percentage of the left measuring value out of a sum of the left measuring value and the right measuring value and a percentage of the right measuring value out of the sum of the left measuring value and the right measuring value based on the left measuring value and the right measuring value, and send the percentage of the left measuring value out of a sum of the left measuring value and the right measuring value and the percentage of the right measuring value out of the sum of the left measuring value and the right measuring value in the output signal.

8. The bicycle power meter of claim 1, wherein the terminal device comprises a display connected to the signal transmitter by signal for displaying a detecting result corresponding to the at least one strain gauge.

9. The bicycle power meter of claim 1, wherein the handlebar and the stem are integrally formed as a monolithic unit.

10. A bicycle power meter which is applied to a bicycle, wherein the bicycle comprises a head and a frame; the head comprises a handlebar and a stem; the stem is connected to the handlebar and the frame; the bicycle power meter comprises:
 at least one strain gauge disposed on an outer peripheral wall of the handlebar, on an inner peripheral wall of the handlebar, or on both the outer peripheral wall and the inner peripheral wall of the handlebar;
 a signal processing unit connected to the at least one strain gauge by signal, wherein the signal processing unit correspondingly outputs an electrical signal based on a deformation of the handlebar detected by the at least one strain gauge;
 a processor connected to the signal processing unit by signal, wherein the processor receives the electrical signal of the signal processing unit and calculates a measuring value based on the electrical signal and outputs the measuring value in an output signal; and
 a signal transmitter connected to the processor by signal, wherein the signal transmitter receives the output signal outputted by the processor and converts the output signal to a wired or wireless signal and sends the wired or wireless signal to a terminal device;
 wherein the handlebar comprises two gripping portions and a connecting portion; one of the gripping portions is connected to an end of the connecting portion, and the other of the gripping portions is connected to another end of the connecting portion; the at least one strain gauge is disposed on the connecting portion;
 wherein the connecting portion has a left section and a right section which are connected to each other; the at least one strain gauge comprises two strain gauges respectively disposed on the left section and the right section; the processor respectively calculates a left measuring value and a right measuring value based on deformations of the left section and the right section detected by the strain gauges disposed on the left section and the right section, and respectively outputs the left measuring value and the right measuring value in the output signal.

11. The bicycle power meter of claim 10, wherein the measuring value comprises at least one of a power value, a torque value, a stress value, and a strain value, or a combination thereof.

12. The bicycle power meter of claim 10, wherein the processor calculates a percentage of the left measuring value out of a sum of the left measuring value and the right measuring value and a percentage of the right measuring value out of the sum of the left measuring value and the right measuring value based on the left measuring value and the right measuring value, and send the percentage of the left measuring value out of a sum of the left measuring value and the right measuring value and the percentage of the right measuring value out of the sum of the left measuring value and the right measuring value in the output signal.

13. The bicycle power meter of claim 10, wherein the terminal device comprises a display connected to the signal transmitter by signal for displaying a detecting result corresponding to the at least one strain gauge.

14. The bicycle power meter of claim 10, wherein the handlebar and the stem are integrally formed as a monolithic unit.

* * * * *